US009423553B2

(12) United States Patent
Saito

(10) Patent No.: US 9,423,553 B2
(45) Date of Patent: Aug. 23, 2016

(54) BACKLIGHT DEVICE

(71) Applicant: 3M INNOVATIVE PROPERTIES COMPANY, St. Paul, MN (US)

(72) Inventor: Yuji Saito, Kanagawa Prefecture (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 106 days.

(21) Appl. No.: 14/346,233

(22) PCT Filed: Sep. 19, 2012

(86) PCT No.: PCT/JP2012/074607
§ 371 (c)(1),
(2) Date: Mar. 20, 2014

(87) PCT Pub. No.: WO2013/042796
PCT Pub. Date: Mar. 28, 2013

(65) Prior Publication Data
US 2015/0177444 A1 Jun. 25, 2015

(30) Foreign Application Priority Data
Sep. 20, 2011 (JP) .................................. 2011-204800

(51) Int. Cl.
*G02F 1/13357* (2006.01)
*F21V 8/00* (2006.01)
(Continued)

(52) U.S. Cl.
CPC ............. *G02B 6/0053* (2013.01); *G02B 5/045* (2013.01); *G02F 1/133615* (2013.01); *G02B 6/0055* (2013.01)

(58) Field of Classification Search
CPC .. G02B 6/055; G02B 6/0053; G02B 6/0038; G02B 5/045; G02B 6/0055; G02F 1/133615; G02F 1/33607; G02F 2001/133607
USPC ............................... 362/607, 626; 349/65, 67
See application file for complete search history.

(56) References Cited

U.S. PATENT DOCUMENTS 5,359,691 A * 10/1994 Tai ....................... G02B 6/0036
362/561
5,966,192 A 10/1999 Higuchi
7,195,364 B2 3/2007 Hahm
(Continued)

FOREIGN PATENT DOCUMENTS

JP 07-94008 4/1995
JP 2000-214460 8/2000
(Continued)

OTHER PUBLICATIONS

International Search Report for PCT International Application No. PCT/JP2012/074607, mailed on Dec. 5, 2012, 4pgs.

*Primary Examiner* — Peggy Neils
(74) *Attorney, Agent, or Firm* — Lisa P. Fulton

(57) ABSTRACT

A backlight device includes a prism film having a top face on a display panel side and a bottom face opposing the top face, and a reflector plate having a reflection face opposing the bottom face. A prism-like pattern is formed on the top face of the prism film and a scattering pattern is formed on the reflection face of the reflector plate. When a first normal line axis of a slope forming the prism-like pattern and a second normal line axis of one slope forming the scattering pattern are projected on an imaginary plane parallel to the display panel, the projected first and second normal line axes form an acute angle.

7 Claims, 11 Drawing Sheets

(51) Int. Cl.
*G02F 1/1335* (2006.01)
*G02B 5/04* (2006.01)

(56) References Cited

U.S. PATENT DOCUMENTS

| | | | |
|---|---|---|---|
| 7,810,978 B2 | 10/2010 | Ohno | |
| 8,192,067 B2 * | 6/2012 | Sato | G02B 6/0038 362/620 |
| 2007/0171651 A1 * | 7/2007 | Park | G02F 1/133605 362/330 |
| 2009/0290098 A1 | 11/2009 | Ogawa | |
| 2010/0277669 A1 * | 11/2010 | Adachi | G02B 6/0056 349/62 |
| 2011/0228558 A1 * | 9/2011 | Uchida | G02B 6/0055 362/607 |

FOREIGN PATENT DOCUMENTS

| | | |
|---|---|---|
| JP | 2002-124116 | 4/2002 |
| JP | 2006-120975 | 5/2006 |
| JP | 2007-220447 | 8/2007 |
| WO | WO 2009-002853 | 12/2008 |
| WO | WO 2009-085543 | 7/2009 |

* cited by examiner

BACKLIGHT DEVICE

TECHNICAL FIELD

An aspect of the present invention is related to a backlight device for use in display devices.

BACKGROUND ART

Conventionally, backlight devices for use in display devices (e.g. liquid crystal displays) are known. For example, it is described that a backlight device including a light guide unit, a light source disposed on at least one end of the light guide unit, and reflection means disposed on a bottom face of the light guide unit that reflect light from the light guide unit (e.g. JP2000-214460A). The reflection means form a triangular shape having a ridge line formed by an apex angle in a direction substantially parallel to the light entrance face of the light guide unit. A plurality of the apex angle is formed uniformly in a direction substantially perpendicular to the light entrance face of the light guide unit.

SUMMARY

Generally, the reflection means (reflector plate) described, for example, in JP2000-214460A, are used with at least one prism film, thereby making it possible to enhance light recycling and obtain a higher luminance. However, the light that has traveled from the reflector plate to the prism film along the direction substantially normal to the display panel returns to the reflector plate as a result of total reflection at the prism film, and then travels again from the reflector plate to the prism film along the direction normal to the display panel. It is possible that the process described above will repeat numerous times before the angle of incidence of the light with respect to the prism film escapes the range of total reflection. Therefore, it is possible that the light will travel back and forth numerous times between the reflector plate and the prism film.

As such, there is a need for technology by which light can be transmitted efficiently to a display panel.

A backlight device according to one aspect of the present invention is a backlight device wherein light emitted from a light source is output toward a rear face of a display panel. The backlight device includes a prism film having a first face on the display panel side and a second face opposing the first face, wherein a prism-like pattern is formed on the first face; and a reflector plate having a reflection face opposing the second face, wherein a scattering pattern is formed on the reflection face. When a first normal line axis of a slope forming the prism-like pattern and a second normal line axis of one slope forming the scattering pattern are projected on an imaginary plane parallel to the display panel, the projected first and second normal line axes form an acute angle.

With such a configuration, a positional relationship between the slope of the pattern on the prism film and the slope of the scattering pattern on the reflector plate is set as the first and second normal line axes projected on the imaginary plane form an acute angle. This configuration leads to more of the light that enters from the prism film being reflected at the reflector plate in a range where repeated total reflection at the prism film will not occur. At least a portion of the light reflected in this manner transmits through the prism film and travels toward the display panel. Thus, it is possible to transmit light more efficiently to the display panel.

In a backlight device according to another aspect of the present invention, an angle formed by the projected first and second normal line axes may be from 5 to 85 degrees.

In a backlight device according to yet another aspect of the present invention, the angle formed by the projected first and second normal line axes may be not less than 25 degrees.

In a backlight device according to yet another aspect of the present invention, the scattering pattern may be a prism-like pattern.

In a backlight device according to yet another aspect of the present invention, the scattering pattern may be formed from a plurality of pyramidal protrusions.

In a backlight device according to yet another aspect of the present invention, the scattering pattern may be formed from a plurality of pyramidal recesses.

In a backlight device according to yet another aspect of the present invention, a light guide provided so as to extend along the reflection face, between the prism film and the reflector plate is further included, wherein the light source is provided so as to be adjacent to a side face of the light guide.

In a backlight device according to yet another aspect of the present invention, a plurality of the prism films is included, wherein each of the plurality of the prism films satisfies the relationship that the projected first and second normal line axes form an acute angle.

With an aspect of the present invention, light can be more efficiently transmitted to a display panel.

DESCRIPTION OF EMBODIMENTS

An embodiment of the present invention is described below in detail while referring to the accompanying drawings. Note that in the descriptions of the drawings, similar or identical components are assigned identical reference numbers and duplicate descriptions thereof are omitted.

First, a configuration of a backlight device 10 according to an embodiment will be described using FIGS. 1 to 7. The backlight device 10 is a component that constitutes a liquid crystal display along with a liquid crystal panel 20, and is provided on a rear face of the liquid crystal panel 20. In order to display an image, it is a role of the backlight device 10 to output light toward the rear face of the liquid crystal panel 20.

Figure 1:
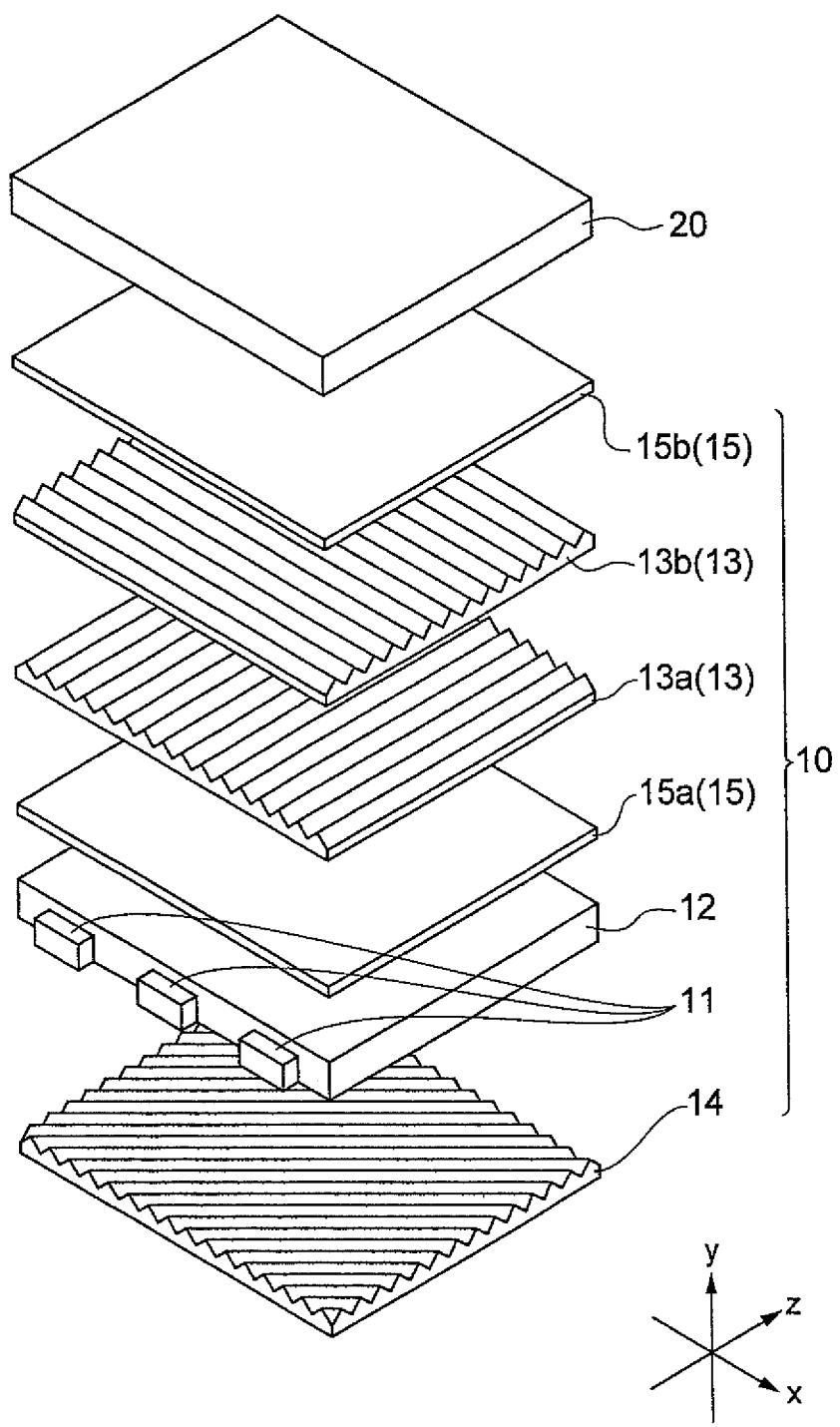
FIG. 1 is an exploded perspective view schematically illustrating a backlight device according to an embodiment.

In FIG. 1, an output direction of the image is in the upward direction and, thus, the backlight device 10 is depicted under the liquid crystal panel 20. Hereinafter, in accordance with FIG. 1, the terms "upper", "top face", "lower", and "bottom face" and the like are used to indicate relationships in a vertical direction of components in the configuration of the backlight device 10. Additionally, in the present specification, in the description of the configuration of the backlight device 10, the "x-axis" is a direction along a pair of opposing sides of the rectangular liquid crystal panel 20, the "y-axis" is a direction normal to an output face of the liquid crystal panel 20, and the "z-axis" is a direction along another pair of opposing sides of the liquid crystal panel 20.

As illustrated in FIG. 1, the backlight device 10 includes a light source 11, a light guide 12, two prism films 13, a reflector film 14, and two diffusing films 15. Hereinafter, as necessary, the two prism films 13 are differentiated as a lower prism film 13a and an upper prism film 13b, and the two diffusing films 15 are differentiated as a lower diffusing film 15a and an upper diffusing film 15b. Of these components, the plate-like members with the exception of the light source 11 are stacked in the following order: the reflector film (reflector plate) 14, the light guide 12, the lower diffusing film 15a, the lower prism film 13a, the upper prism film 13b, and the upper diffusing film 15b.

The light source 11 is disposed so as to be adjacent to a side face of the light guide 12 and, thus, the backlight device 10 is an edge-lit type (side-lit type) device. In this embodiment, the light source 11 consists of three light emitting diodes (LED), but the number of the light emitting diodes (LED) is not particularly limited. Additionally, the light source 11 may be a different illuminant such as a cold cathode tube, or the like. The light source 11 may be disposed on only one side face of the light guide 12, or may be disposed on two opposing side faces of the light guide 12.

The light guide 12 is a plate-like member for directing light that enters from the light source 11 in a direction normal to the liquid crystal panel 20 (the y-axis direction). In the present specification, a cross-sectional shape of the light guide 12 parallel to the y-z plane is rectangular, but a configuration is possible wherein the cross-section is tapered so as to partially or uniformly narrow with distance from the light source 11.

The lower diffusing film 15a and the upper diffusing film 15b are plate-like members provided for the purpose of eliminating inconsistencies and the like in luminance (brightness) at a front surface of the liquid crystal panel 20.

Both of the two prism films 13 are plate-like members that are used to increase the luminance at the front surface of the liquid crystal panel 20. Examples of products that can be used as the prism films 13 include TBEF (manufactured by 3M).

A prism-like pattern (hereinafter referred to as the "prism pattern") is formed on a top face (first face) of each of the prism films 13. The prism pattern can be configured as a pattern in which a plurality of collapsed triangular poles is arranged in a uniform direction. Additionally, the prism pattern can be configured as a pattern in which mountain-like protrusions formed from two slopes that sandwich a linear ridge line are arranged in a uniform direction. Alternatively, the prism pattern can be configured as a pattern in which "V" shaped grooves extending along a uniform direction are arranged in a uniform direction.

When viewed from the liquid crystal panel 20 side, the ridge lines of the prism patterns of the lower prism film 13a and the upper prism film 13b overlap so as to be perpendicular to each other.

Additionally, a reflecting polarization film can be used. The reflecting polarization film is a plate-like member that is used to increase the luminance at the front surface of the liquid crystal panel 20. Examples of products that can be used as the reflecting polarization film include DBEF (manufactured by 3M).

The reflector film 14 is a plate-like member wherein the top face thereof is a reflection face that totally reflects light. Therefore, the reflection face (indirectly) opposes the bottom face of the prism films 13. Examples of products that can be used as the reflector film 14 include silver reflector plates and ESR (manufactured by 3M). A scattering pattern is formed on the reflection face.

Figure 2:
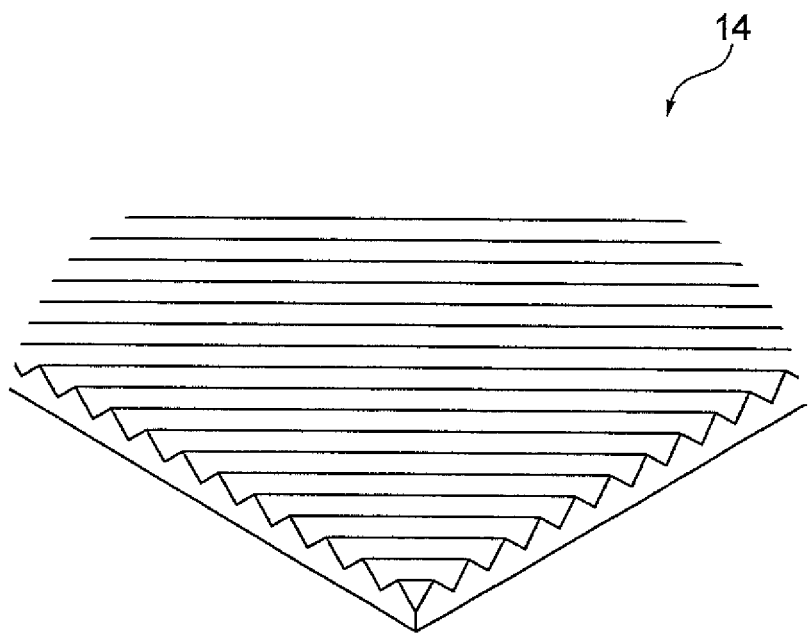
FIG. 2 is a partial enlarged view illustrating the reflector film depicted in FIG. 1.
Figure 3:
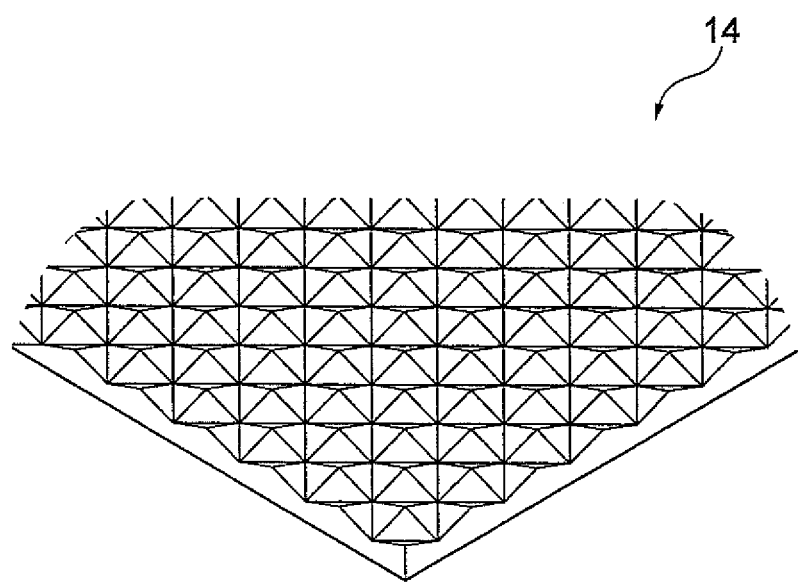
FIG. 3 is a partial enlarged view illustrating another example of the reflector film.
Figure 4:
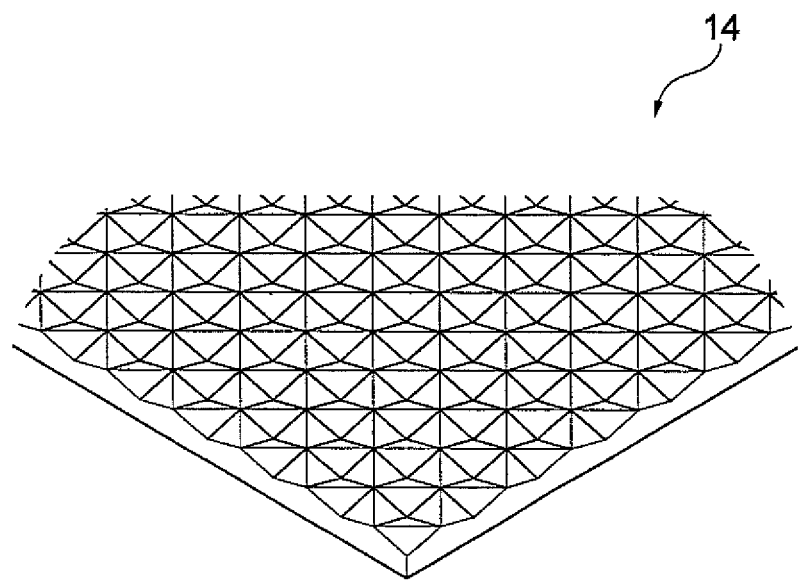
FIG. 4 is a partial enlarged view illustrating yet another example of the reflector film.

Examples of the scattering pattern are illustrated in FIGS. 2 to 4. First of all, as illustrated in FIG. 2, the scattering pattern may be a prism pattern similar to the prism films 13, and in such a case, a unit component of the scattering pattern is a prism. Additionally, the scattering pattern may be a pattern in which pyramidal protrusions are arranged. In the example illustrated in FIG. 3, the unit component of the scattering pattern is a four-sided pyramidal protrusion, but the protrusions may be a different shape such as a three-sided pyramid or the like. Additionally, the scattering pattern may be a pattern in which pyramidal recesses are arranged. In the example illustrated in FIG. 4, the unit component of the scattering pattern is a four-sided pyramidal recess, but the recesses may be a different shape such as a three-sided pyramid or the like.

Thus, the specific shape of the scattering pattern is not limited. However, at least one of the slopes forming the scattering pattern must be formed while taking into consideration the direction of the slope forming the prism pattern of each of the prism films 13. Specifically, when the first normal line axis of the slope forming the prism pattern of each of the prism films 13 and a second normal line axis of one slope forming the scattering pattern are projected on an imaginary plane 30 parallel to the liquid crystal panel 20, the projected two normal line axes must form an acute angle. In the present specification, the angle formed by the first normal line axis and the second normal line axis is referred to as the "bias". A minimum of the bias (acute angle) may be 5 degrees or 25 degrees. A maximum of the bias may be 65 degrees or 85 degrees. Note that the liquid crystal panel 20 and each of the plate-like members that form the backlight device 10 are substantially parallel and, therefore, the imaginary plane 30 is a plane that is parallel with each of the plate-like members.

Figure 5:
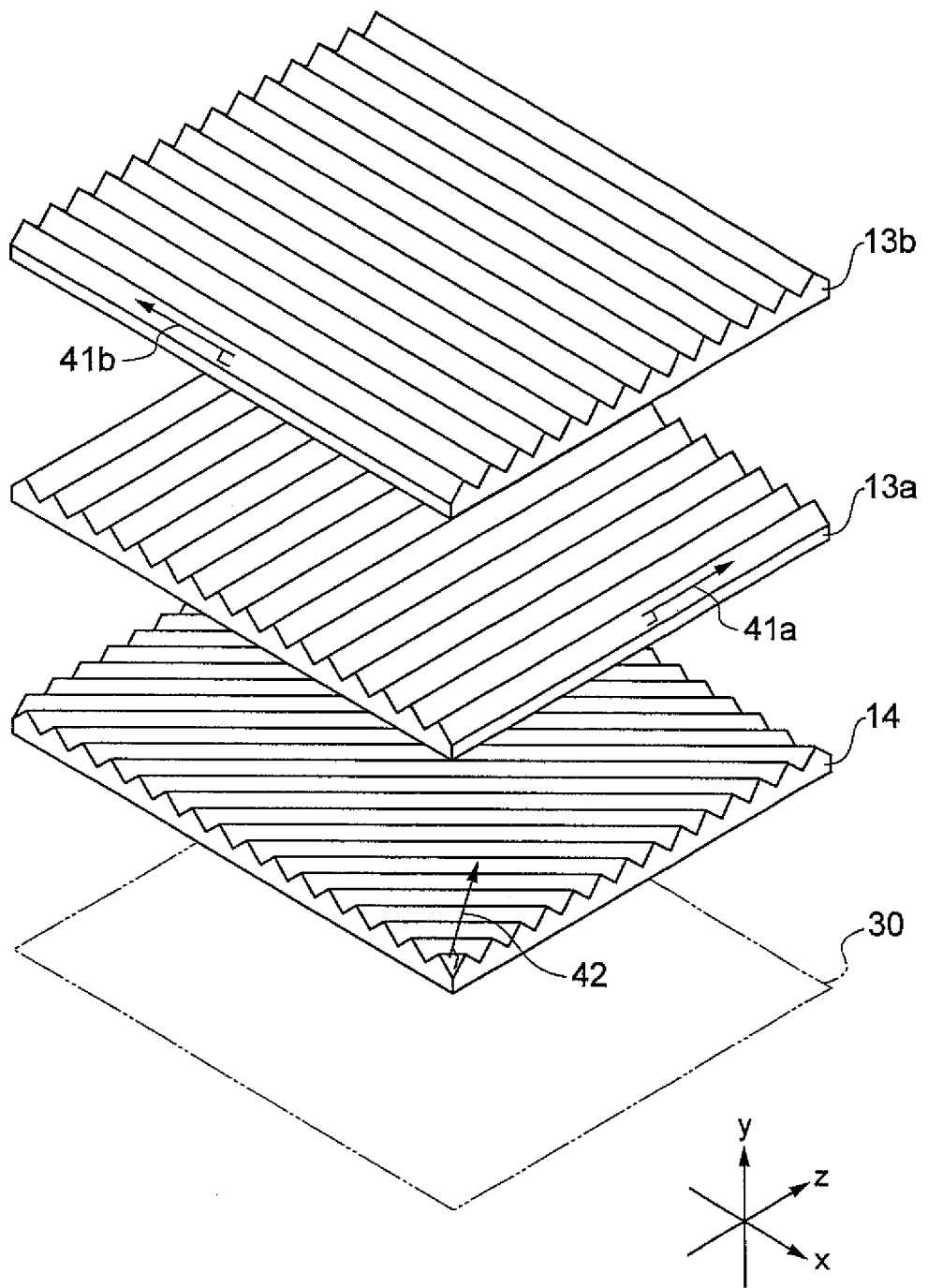
FIG. 5 is a perspective view schematically illustrating a relationship of a prism pattern between a prism film and the reflector film.
Figure 6:
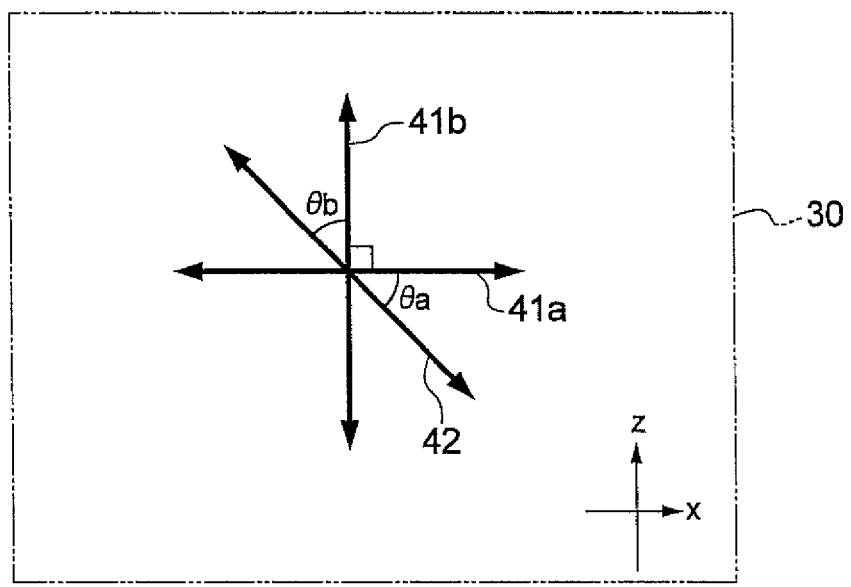
FIG. 6 is a drawing illustrating each of the normal lines depicted in FIG. 5 projected on an imaginary plane.

For example, when the scattering pattern is the prism pattern illustrated in the example of FIG. 5, as illustrated in FIG. 6, the acute angle formed by a normal line axis 42 of the scattering pattern of the reflector film 14 and a normal line axis 41a of the prism pattern of the lower prism film 13a is θa degrees; and the acute angle formed by the normal line axis 42 and a normal line axis 41b of the prism pattern of the upper prism film 13b is θb degrees.

With the prism-like scattering patterns illustrated in FIGS. 2 and 5, each of the two slopes forming one of the prisms satisfies the relationship that the second normal line axis and the first normal line axis form an acute angle. Additionally, the four slopes forming the four-sided pyramidal protrusions and recesses illustrated in FIGS. 3 and 4 satisfy the relationship that the second normal line axis and the first normal line axis form an acute angle. Of course, it is not necessary that all of the slopes forming the scattering pattern satisfy this relationship. Various forms of the scattering pattern are conceivable, but it is sufficient that at least one of the slopes of the unit components of the scattering pattern satisfy the relationship that the second normal line axis and the first normal line axis form an acute angle.

The scattering pattern such as that illustrated in FIGS. 2 to 4 can be formed by subjecting the silver reflector plate or the ESR described above to a hot press method or a frame embossing method. Furthermore, after forming the scattering pattern using micro-replication technology, the reflector film (reflector plate) can be obtained by coating a metal such as silver or the like on the front surface of the film (plate) using a sputtering, deposition, or plating method.

As described above, according to this embodiment, the positional relationship between the slope of the prism pattern on the prism film 13 and the slope of the scattering pattern on the reflector film 14 is set as the first normal line axis (e.g. the normal line axes 41a and 41b) and the second normal line axis (e.g. the normal line axis 42) projected on the imaginary plane 30 form an acute angle. This configuration leads to more of the light that enters from the prism film 13 being reflected at the reflector film 14 in a range where repeated total reflection at the prism film 13 will not occur. At least a portion of the light reflected in this manner transmits through the prism film 13 and travels toward the liquid crystal panel 20. Thus, it is possible to transmit light more efficiently to the liquid crystal panel 20.

Figure 7:
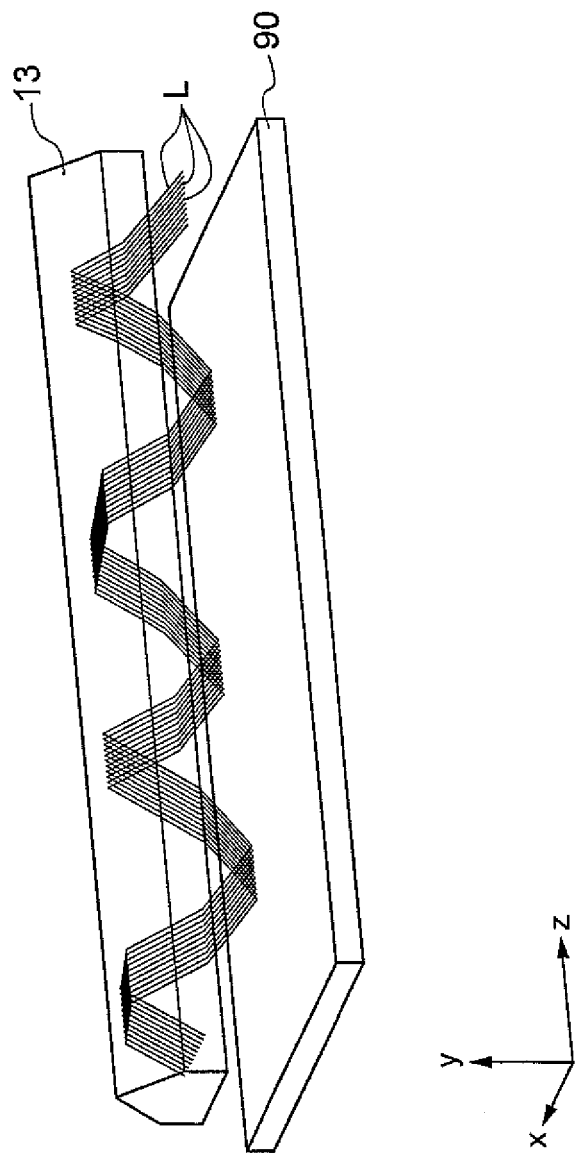
FIG. 7 is a drawing schematically illustrating light traveling in the backlight device.

The effects described above are described in further detail using FIG. 7. FIG. 7 illustrates the recycling of light L between the prism films 13 and a reflector plate 90 having a flat reflection face without a scattering pattern. Specifically, the light L travels along the z-axis (along the prism shape of one of the prism films 13) within space enclosed by the plate-like members while repeatedly total reflecting between the prism films 13 and the reflector plate 90. When the light L is projected on the x-y-plane, the light L appears to come and go between the prism films 13 and the reflector plate 90 substantially along the y-axis. This process continues until the angle of incidence of the light with respect to the prism shape escapes the region of total reflection. The phenomenon described above applies likewise for light traveling along the x-axis direction (light traveling while shifting to an adjacent prism).

In an actual system, it is thought that the light will escape the region of total reflection somewhat easier than in the system illustrated in FIG. 7 due to the scattering at the light guide and the diffusing film. However, a degree of diffusion of the light guide and the diffusing film tends to decline and, therefore, it is important to consider a path of light that travels back and forth repeatedly between the prism film and the reflector plate.

In this embodiment, the scattering pattern is not simply formed on the reflection face of the reflector film 14, as is the case with the conventional technology. In this embodiment, the path of light from the prism films 13 to the reflector film 14 is taken into account and a position of the slope of the scattering pattern on the reflector film 14, with respect to the prism pattern on the prism films 13, is determined. The slope that is configured as described above changes the direction of reflection of light that enters from the prism films 13. Moreover, the incident light that has a changed direction of reflection escapes to a path different from the path of numerous repeated recycling (see FIG. 7) and, therefore, a portion of the incident light is refracted at the prism films 13 and is directed toward the liquid crystal panel 20. Thus, it is possible to guide light more efficiently to the liquid crystal panel 20 and, as a result, the luminance of the liquid crystal panel 20 is enhanced.

There has been a demand for liquid crystal panels with increased levels of luminance for some time. However, the conventional technology in which the refractive index of the resin used in the prism film is increased is approaching its limit. It is, in fact, known that luminance decreases when the refractive index exceeds a certain level. Thus, a technology to replace that of enhancing the luminance of liquid crystal panels by raising the refractive index of the resin used has been desired and this embodiment answers such a need. Additionally, with this embodiment, light is transmitted efficiently to the liquid crystal panel and, therefore, it is also possible to reduce the energy consumption of the liquid crystal display.

EXAMPLES

Hereinafter, a backlight device according to an aspect of the present invention will be described in detail based on examples, but the configuration of the backlight device is not limited to these examples.

Working Example 1

Performance of the backlight device was evaluated via a computer simulation using the software, LightTools® ver. 6.3.0. Attributes of the backlight device model were set as follows.

Figure 8:
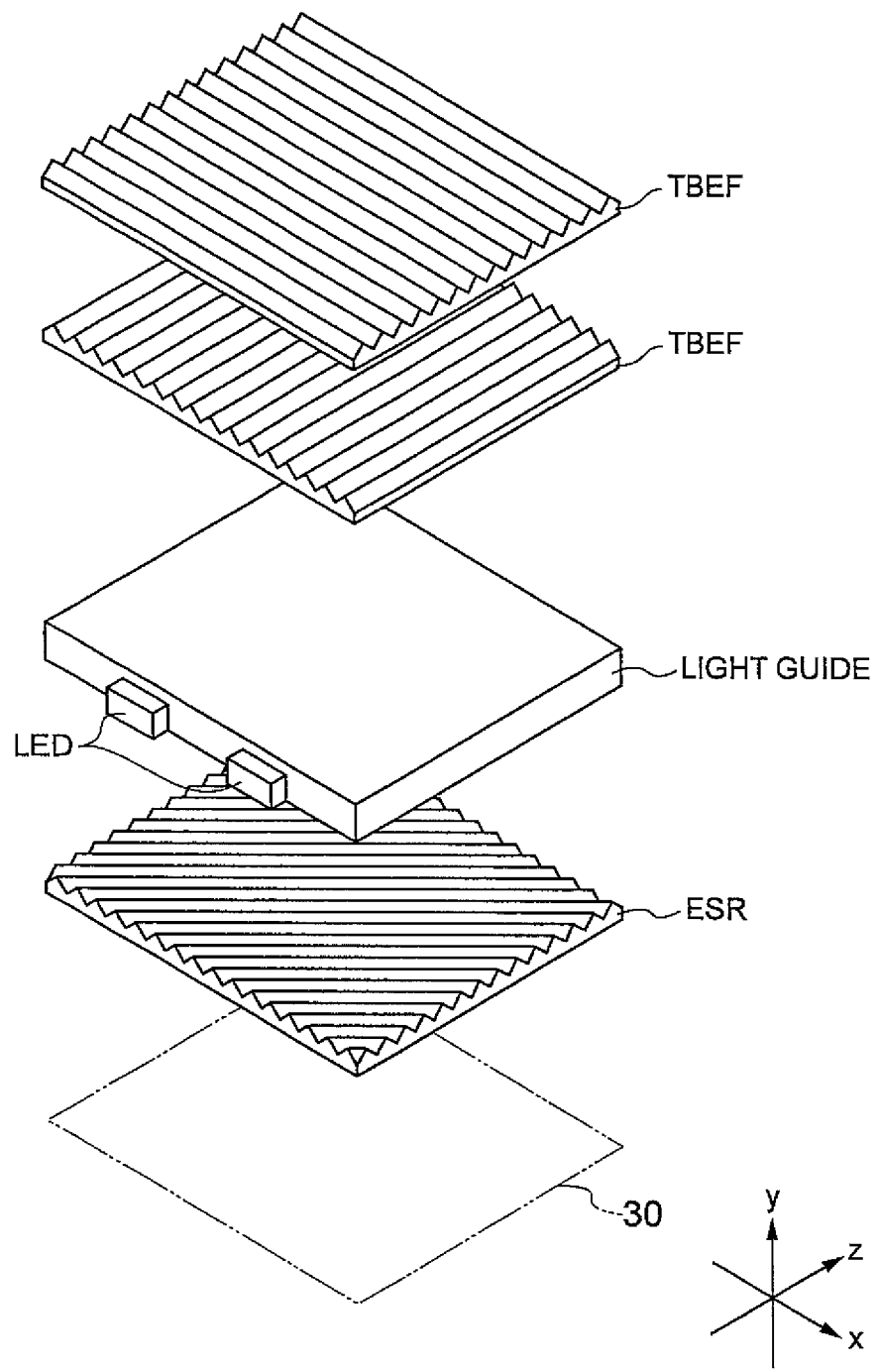
FIG. 8 is an exploded perspective view illustrating the backlight device used in the examples (computer simulation).

Dimensions: 45 mm×30 mm
Type: Edge-lit device
Structure of light guide: Light guide having spherical light extractors on a bottom face thereof
Light source: Two LEDs
Two prism films: TBEF 2-GT (24), manufactured by 3M; prism pitch=24 μm. Hereinafter, as necessary, the two prism films are differentiated as "TBEF1" and "TBEF2".
Reflector film: ESR, manufactured by 3M, having a prism pattern formed on a reflection face thereof; Prism pitch =50 μm
Diffusing Film None A backlight device model configured as described above and the imaginary plane 30 as described in the embodiment are illustrated in FIG. 8. Three-dimensional coordinates (x-axis, y-axis, and z-axis) were configured as described in the embodiment.

Figure 9:
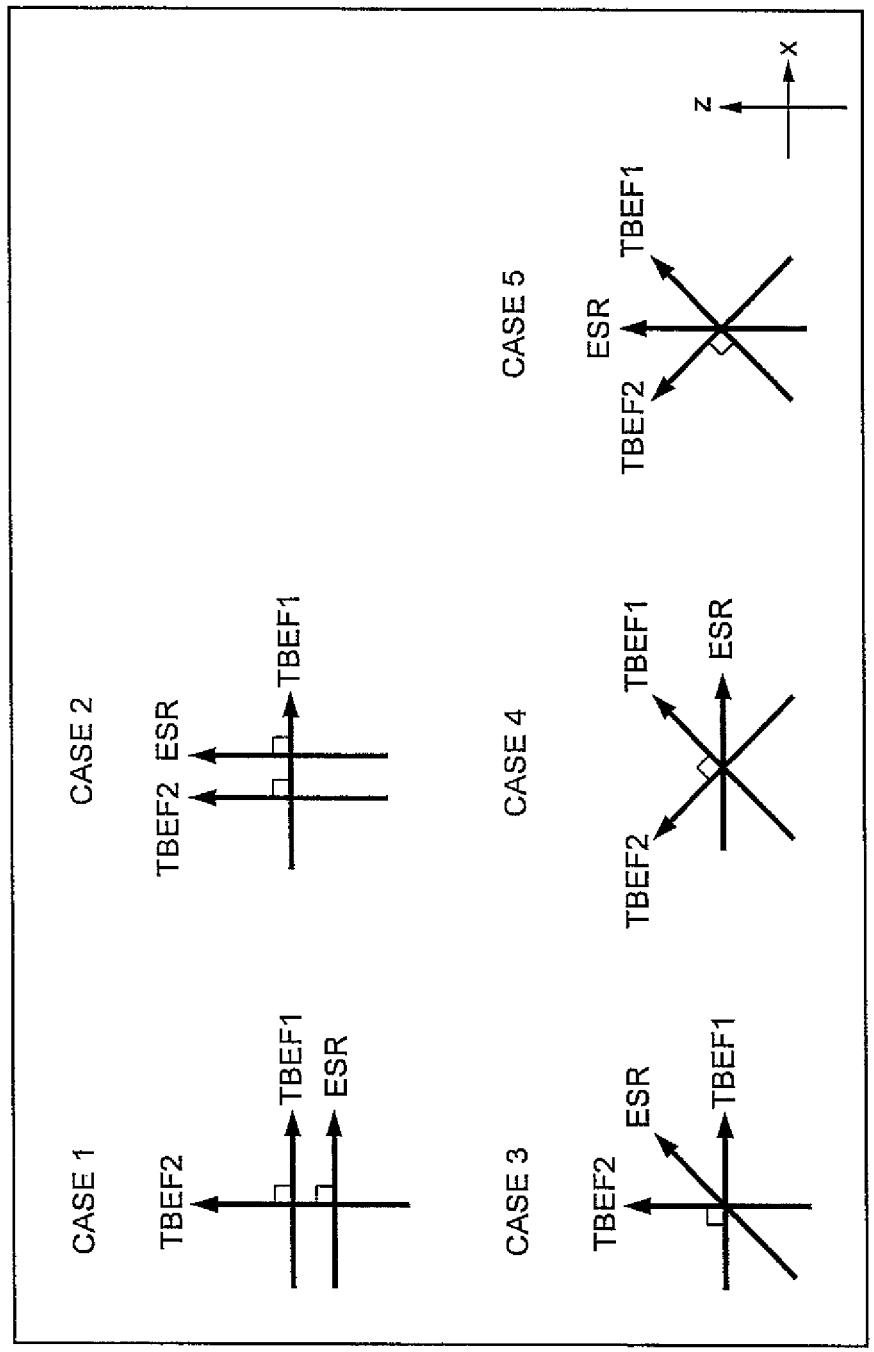
FIG. 9 is a diagram illustrating the prism pattern between the prism film and the reflector film of Working Example 1.

As shown in FIG. 9, five variations of the relative positional relationship between the normal line (first normal line) of the slope forming the prism pattern of the two prism films (TBEF) and the normal line (second normal line) of the slope forming the prism pattern of the reflector film (ESR) were configured. FIG. 9 shows the normal lines of the TBEF1 and the TBEF2 and the normal line of the ESR projected on the imaginary plane 30 (x-z plane).

Concerning the normal lines of the TBEF1 and TBEF2, in Cases 1 to 3, the projected normal line of the TBEF1 was parallel to the x-axis and the projected normal line of the TBEF2 was parallel to the z-axis. On the other hand, in Cases 4 and 5, the projected normal lines of the TBEF1 and TBEF2 were inclined 45 degrees and 135 degrees, respectively, with respect to the x-axis.

Concerning the relationship between the normal lines of the TBEF1, TBEF2, and the ESR, in Cases 1 and 2, the projected normal line of the ESR was parallel to one of the projected normal lines of the TBEF1 and TBEF2 and, therefore, the bias was 0 degrees (or 90 degrees). In contrast, in Cases 3 to 5, the biases of both the TBEF1 and TBEF2 were 45 degrees. Thus, Cases 1 and 2 can be considered as Comparative Examples and Cases 3 to 5 can be considered as Working Examples. In each of the Cases 1 to 5 configured as described above, performance of the backlight device was evaluated while varying each prism base angle of the ESR, which has an isosceles triangle cross-section, 5 degrees at a time in a range from 0 to 45 degrees. The performance of the backlight device was evaluated according to the luminance measured using a virtual luminance meter placed on the top face of the upper TBEF.

Figure 10:
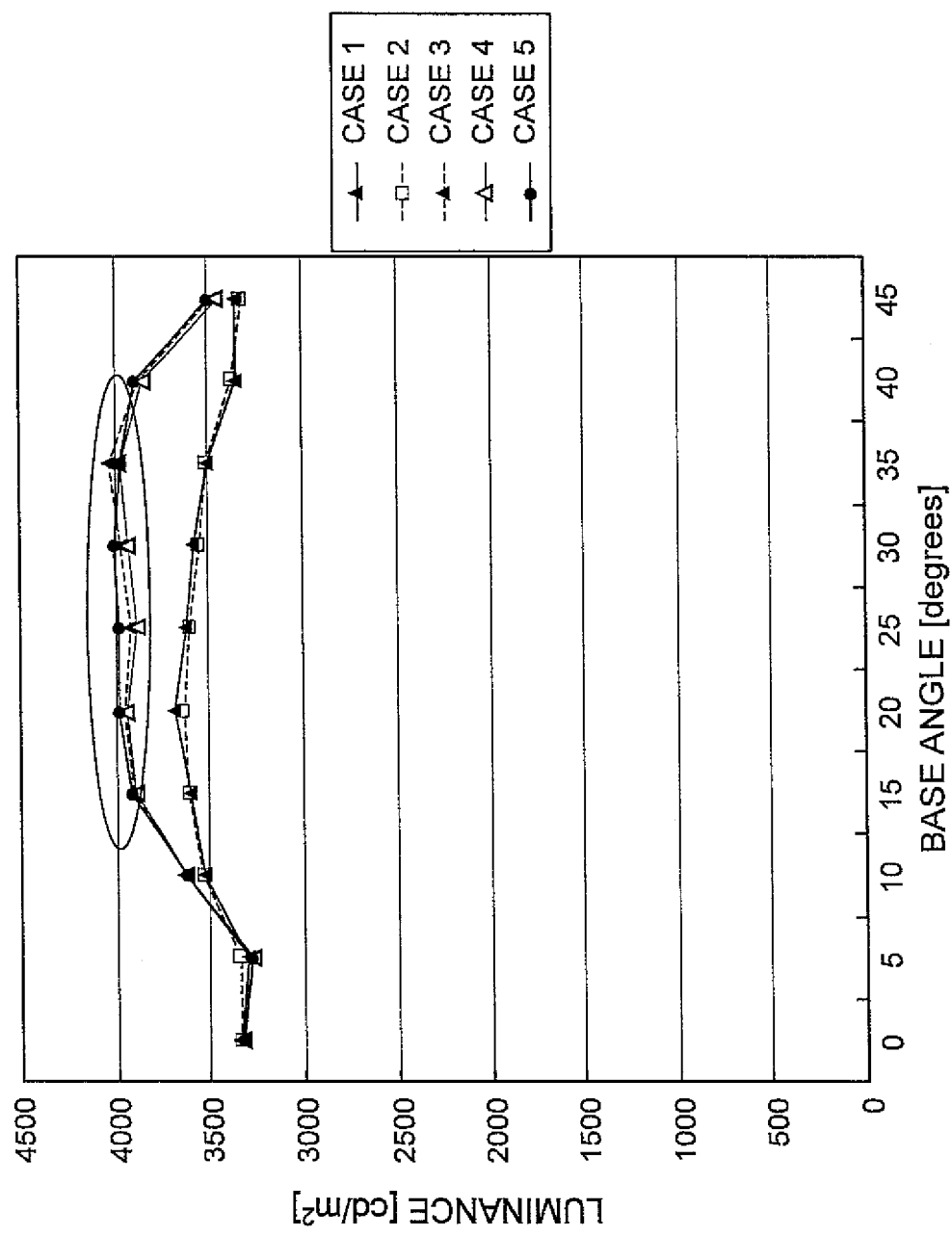
FIG. 10 is a graph showing the simulation results for Working Example 1.

Simulation results are shown in the graph of FIG. 10. The calculated luminance (cd/m$^2$) is shown on the vertical axis and the prism base angle (degrees) of the ESR is shown on the horizontal axis of the graph.

Working Example 2

A backlight device model was configured as in Working, Example 1 (see

FIG. 8). Seven cases were configured where each prism base angle of the ESR, which has an isosceles triangle cross-section, was 10, 15, 20, 25, 30, 35, and 40 degrees, respectively. Then the performance of the backlight was evaluated while varying the bias formed by the ESR and one of the TBEFs (TBEF1 and TBEF2) 5 degrees at a time in a range from 0 to 90 degrees. The point of measurement of the luminance was the same as in Working Example 1.

Figure 11:
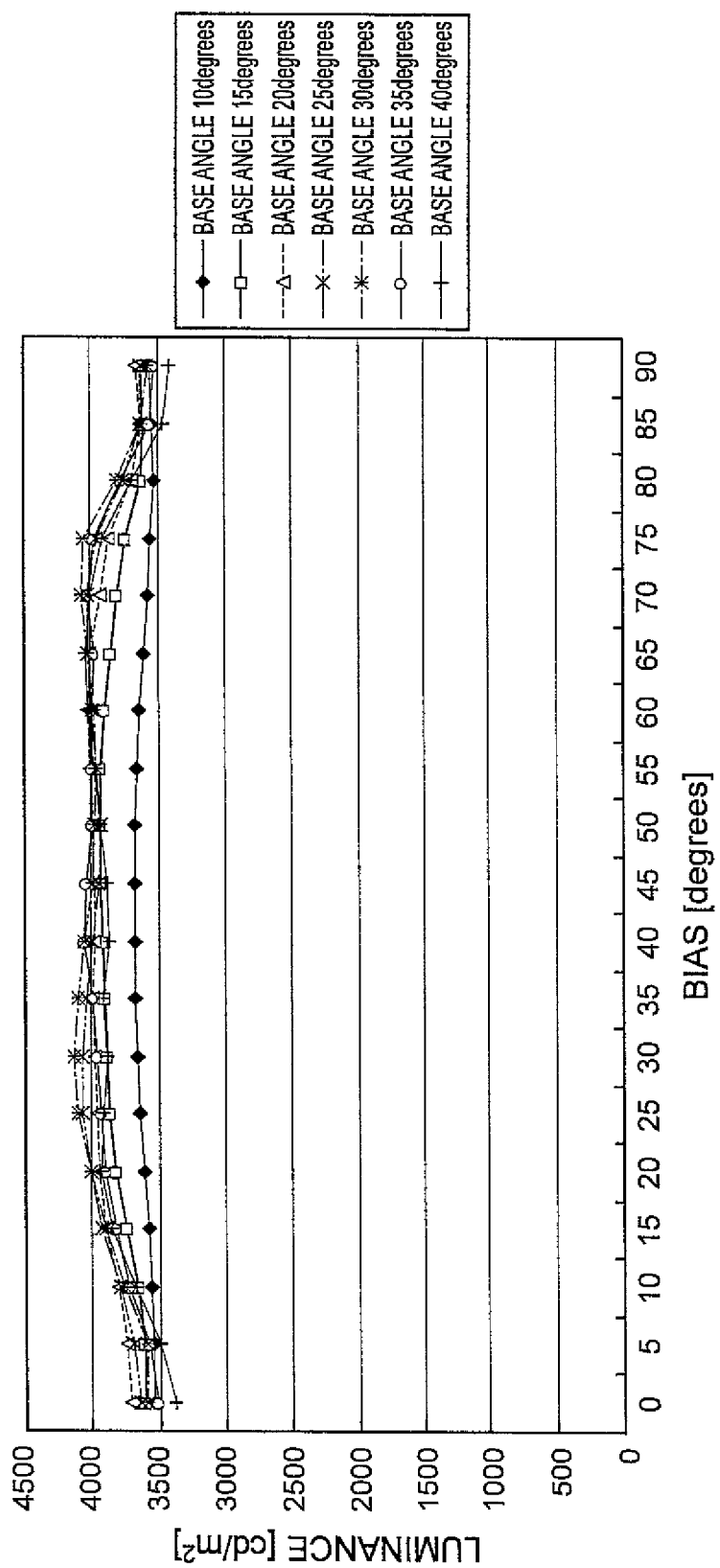
FIG. 11 is a graph showing the simulation results for Working Example 2.

Simulation results are shown in the graph of FIG. 11. The calculated luminance (cd/m$^2$) is shown on the vertical axis and the bias (degrees) is shown on the horizontal axis of the graph.

The present invention has been described in detail based on the embodiment. However, the present invention is not limited to the embodiment described above. Various modifications can be made to the present invention without deviating from the scope thereof.

For example, in the embodiment, the backlight device 10 included two prism films 13, but it is possible to use only one prism film. Additionally, in the embodiment, the backlight device 10 included two diffusing films 15, but it is possible only to use one diffusing film or, alternatively, to not use any diffusing films at all.

In the embodiment, the backlight device 10 was described as a component of a liquid crystal display, but the type of display device (display panel) to which the backlight device according to an aspect of the present invention can be applied is not limited to liquid crystal displays (liquid crystal panels).

In the embodiment, the backlight device 10 was an edge-lit device, but an aspect of the present invention can be applied to various types of backlights. For example, an aspect of the present invention can be applied to a direct-lit backlight that is not provided with a light guide.

REFERENCE SIGNS LIST

10 . . . backlight device,
11 . . . light source,
12 . . . light guide,
13 . . . prism film,
13a . . . lower prism film,
13b . . . upper prism film,
14 . . . reflector film (reflector plate),
15 . . . diffusing film,
15a . . . lower diffusing film,
15b . . . upper diffusing film,
20 . . . liquid crystal panel (display panel),
30 . . . imaginary plane,
41a and 41b . . . first normal line axis,
42 . . . second normal line axis

The invention claimed is:

1. A backlight device, wherein light emitted from a light source is output toward a rear face of a display panel, comprising:
a plurality of prism films, each including a first face on the display panel side and a second face opposing the first face, wherein a prism-like pattern is formed on the first face, and
a reflector plate including a reflection face opposing the second face, wherein a scattering pattern is formed on the reflection face
wherein,
for each of the plurality of prims films when a first normal line axis of a slope forming the prism-like pattern and a second normal line axis of one slope forming the scattering pattern are projected on an imaginary plane parallel to the display panel, the projected first and second normal line axes form an acute angle.

2. The backlight device according to claim 1, wherein the angle formed by the projected first and second normal line axes is from 5 to 85 degrees.

3. The backlight device according to claim 2, wherein the angle formed by the projected first and second normal line axes is not less than 25 degrees.

4. The backlight device according to claim 1, wherein the scattering pattern is a prism-like pattern.

5. The backlight device according to claim 1, wherein the scattering pattern comprises a plurality of pyramidal protrusions.

6. The backlight device according to claim 1, wherein the scattering pattern comprises a plurality of pyramidal recesses.

7. The backlight device according to claim 1, further comprising a light guide provided so as to extend along the reflection face, between the prism film and the reflector plate, wherein
the light source is provided so as to be adjacent to a side face of the light guide.

* * * * *